(12) United States Patent
Mäenpää

(10) Patent No.: US 7,539,138 B2
(45) Date of Patent: May 26, 2009

(54) METHOD OF ARRANGING DATA TRANSFER IN A WIRELESS TELECOMMUNICATION SYSTEM

(75) Inventor: Henri Mäenpää, Tampere (FI)

(73) Assignee: Nokia Corporation, Espoo (FI)

( * ) Notice: Subject to any disclaimer, the term of this patent is extended or adjusted under 35 U.S.C. 154(b) by 965 days.

(21) Appl. No.: 10/372,712

(22) Filed: Feb. 25, 2003

(65) Prior Publication Data

US 2003/0185202 A1    Oct. 2, 2003

Related U.S. Application Data

(63) Continuation of application No. PCT/FI01/00748, filed on Aug. 24, 2001.

(30) Foreign Application Priority Data

Aug. 25, 2000 (FI) ................................. 20001877

(51) Int. Cl.
*G01R 31/08* (2006.01)
(52) U.S. Cl. ....................................... 370/235; 370/331
(58) Field of Classification Search .................. None
See application file for complete search history.

(56) References Cited

U.S. PATENT DOCUMENTS

| 4,939,725 | A | * | 7/1990 | Matsuda et al. ............. 370/445 |
| 5,933,784 | A | | 8/1999 | Gallagher et al. |
| 6,091,709 | A | * | 7/2000 | Harrison et al. ............. 370/235 |
| 6,097,733 | A | * | 8/2000 | Basu et al. .................. 370/468 |
| 6,253,249 | B1 | * | 6/2001 | Belzile ........................ 709/249 |
| 6,539,237 | B1 | * | 3/2003 | Sayers et al. ................ 455/555 |

(Continued)

FOREIGN PATENT DOCUMENTS

EP    0 766 490    4/1997

(Continued)

OTHER PUBLICATIONS

INFOCOM '96. Fifteenth Annual Joint Conference of the IEEE Computer S Networking the Next Generation Proceedings IEEE, vol. 3, 1996; "Handling Mobility in a Wirelss ATM Network", Akyol et al, pp. 1405-1413.

*Primary Examiner*—Robert W Wilson
(74) *Attorney, Agent, or Firm*—Squire, Sanders & Dempsey, LLP (57) ABSTRACT

A method of arranging data transfer in a wireless telecommunication system comprising at least one wireless terminal, a first radio access gateway and a first base station connected thereto, a second radio access gateway and a second base station connected thereto. The first base station and the first radio access gateway are arranged to transmit data between the terminal and an end point in an IP-based network. Address information on the second radio access gateway is specified to the first radio access gateway when it is detected that handover from the first base station to the second base station is needed for the terminal. Data directed to the terminal is transmitted through the first radio access gateway and the second radio access gateway to a wireless network after the terminal has been handed over to the second base station. The address information on the second radio access gateway is transmitted to the end point in the IP network and the data directed to the terminal is transmitted from the end point to the second radio access gateway.

15 Claims, 4 Drawing Sheets

Fig. 2

U.S. PATENT DOCUMENTS

| | | | | |
|---|---|---|---|---|
| 6,571,212 | B1 * | 5/2003 | Dent | 704/270.1 |
| 6,625,135 | B1 * | 9/2003 | Johnson et al. | 370/332 |
| 6,654,607 | B1 * | 11/2003 | Shobatake et al. | 455/433 |
| 6,850,503 | B2 * | 2/2005 | Dorenbosch et al. | 370/331 |

FOREIGN PATENT DOCUMENTS

| | | |
|---|---|---|
| WO | WO 00/48417 | 8/2000 |

* cited by examiner

METHOD OF ARRANGING DATA TRANSFER
IN A WIRELESS TELECOMMUNICATION
SYSTEM

This is a Continuation of International Application No. PCT/FI01/00748 filed Aug. 24, 2001, which designated the U.S. and was published under PCT Article 21(2) in English.

BACKGROUND OF THE INVENTION

The invention relates to handover in wireless telecommunication systems, particularly to changing a radio access gateway between an IP (Internet Protocol) network and a wireless network.

Transferring date associated with various time-critical applications in IP-based networks has been an attractive topic in recent years. An important field of application is Voice over IP (VoIP), i.e. voice transfer utilizing an IP protocol. An H.323 is a standard specified by the International Telecommunication Union (ITU) for packing voice and video image used in video conference programs and for call control. The H.323 standard specifies packet-based transfer of multimedia streams (audio, video, data) in systems that do not necessarily guarantee quality of service (QoS). The H.323 standard is applicable to any IP (Internet Protocol) based network, such as the Internet. H.323 devices can be used both for point-to-point calls and various point-to-multipoint applications. The H.323 is part of a larger collection of standards, i.e. H.32X series standards, which specifies various conference standards for different network types. The H.323 is designed to be compatible with all H.32X standards.

Another standard used for transferring VoIP is a Session Initiation Protocol (SIP), which is a control protocol on the application level developed by the Internet Engineering Task Force (IETF). H.248/Megaco, a standard common to the ITU and IETF for gateways, may also be used in transferring VoIP.

Wireless telecommunication systems utilize radio access gateways (RAGW), which transmit data between a circuit-switched wireless network and an end point in a packet-switched IP network based on an IP protocol. A plurality of base stations controlled by a radio access gateway is typically connected to the radio access gateways. The wireless network can be, for example, a network according to the GSM standard. A radio access network is thus a general term for a device which performs a protocol conversion on the data transmitted between the protocol used in a wireless network and the protocol used in an IP network. The radio access gateways are used particularly for providing wireless connections in different office environments wherein the radio access gateways enable a company local area network and a mobile communication network to be connected. It is to be noted that hereinafter, data transfer may refer to transferring any one or more types of media (audio, video, data). In connection with the present application, the term data is thus used to generally refer to any information regardless of the type thereof.

Current IP-based standards used for transferring audio or video do not as such support handover for an active connection of a terminal. In connection with the present application, the term handover refers to changing a radio traffic channel and radio traffic responsibility from a source system to a target system such that a data transmission connection is maintained for a user's service. Handover may take place because the terminal moves or for other reasons, such as for balancing the load between cells. The radio access gateways are typically connected to, i.e. they are associated with, one or more base stations, and the radio access gateway performs a protocol conversion on the data associated with the terminals served by the base stations. If handover is needed to a base station which is connected to a different radio access gateway, the radio access gateway used must also be changed.

Since each radio access gateway is typically provided with a unique IP address of its own, changing the radio access gateway used would also require the IP address to be changed at the end point in the IP network. This could be carried out by directing the media streams from the end point in the IP network to a new radio access gateway and by excluding the old radio access gateway from connection provision. A major problem with supporting mobility in the devices used for VoIP is that they do not support redirection of media streams at all, or they certainly do not support fast redirection. Consequently, during an active connection, another end point in the IP network cannot be configured to use a new radio access gateway without the quality of service (e.g. speech quality) degrading significantly.

BRIEF DESCRIPTION OF THE INVENTION

An object of the invention is thus to provide an improved arrangement for changing a radio access gateway in a wireless telecommunication system. The objects of the invention are achieved by a method, a system according to the method and a network part according to the method, which are characterized by what is disclosed in the independent claims. Preferred embodiments of the invention are disclosed in the dependent claims.

In a solution of the invention, when it is detected that handover is needed for a terminal from a base station connected to a first radio access gateway to a base station connected to a second radio access gateway, address information on the second radio access gateway is specified to the first radio access gateway. Data directed to the terminal is transferred through the first radio access gateway and the second radio access gateway when the terminal has been handed over to the base station connected to said second radio access gateway. Hence, a base station connected to different radio access gateways can be changed such that the data transmission connection provided for the wireless terminal remains uninterrupted. However, using two radio access gateways also causes problems: the amount of frequency band used increases and the quality of service (QoS) degrades because of an additional routing point on the application layer. The idea underlying the invention is that the address information on the second radio access gateway is transmitted to the end point in the IP network. The data directed to the terminal is transmitted from the end point to said second radio access gateway according to the address information.

The solution of the invention provides the advantage that the radio access gateway can be changed during an active data transfer such that the quality of service degrades as little as possible during and after the execution of handover. By redirecting the data transmission from the end point to the second radio access gateway, the problems caused by using two routing points are avoided.

According to a preferred embodiment of the invention, address information on the end point is transmitted to the second radio access gateway. The data received from the terminal can be transmitted from the second radio access gateway to the terminal immediately after the handover. This is advantageous in that the data transmitted by the terminal does not need to be transmitted through an anchor radio access gateway at all, nor does the quality of service of the data transmitted from the terminal degrade because of the two routing points.

BRIEF DESCRIPTION OF THE DRAWINGS

The invention is now described in closer detail in connection with the preferred embodiments and with reference to the accompanying drawings, in which.

DETAILED DESCRIPTION OF THE INVENTION

The invention can be applied to any wireless telecommunication system comprising radio access gateways for transferring data between a wireless network and an IP network. In the following, a preferred embodiment of the invention will be described wherein data comprising voice information is transferred in a wireless network and an IP network. It is to be noted, however, that the invention may also be used in transferring other kind of data, for instance in transferring data comprising video information.

Figure 1:
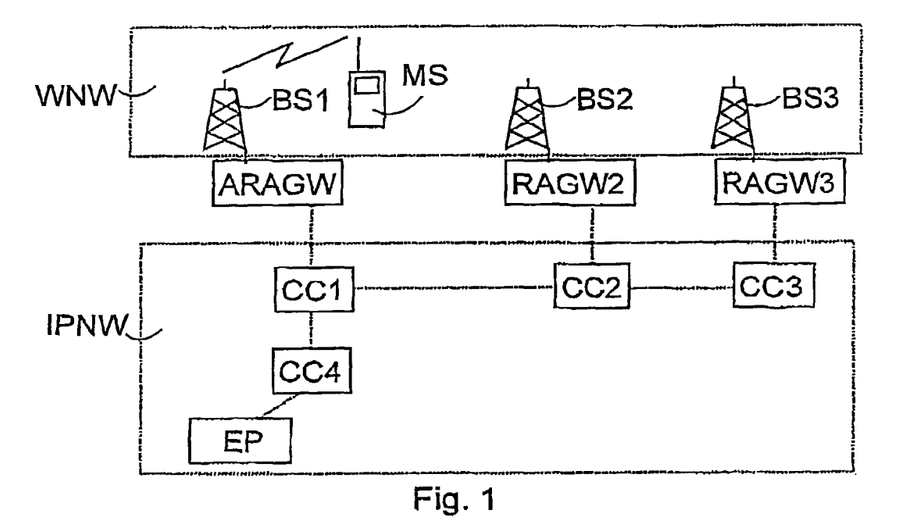
FIG. 1 shows a wireless telecommunication system of a preferred embodiment of the invention.

FIG. 1 shows a wireless telecommunication system comprising radio access gateways a simplified manner, taking only relevant parts to the invention into account. A terminal MS is, for example, a wireless terminal according to the GSM system enabling a voice connection. The voice connection of the terminal MS refers to a logical connection for transferring voice information formed by a wireless connection provided for the terminal MS, also known as a Radio Resource (RR) connection, and a logical VoIP connection established to an IP network IPNW. A base station BS1, BS2, BS3 comprises a transceiver and serves over a radio interface the registered terminals MS within its coverage area. A radio access gateway ARAGW, RAGW2, RAGW3 is connected to a certain number of base stations BS1 to BS3 controlled by the radio access gateway, the data associated with the terminals MS served by the base stations being transmitted by the radio access gateway. Consequently, the radio access gateways are provided with a service area defined by the coverage area of the base stations connected thereto. For the sake of clarity, in the example of FIG. 1 each radio access gateway ARAGW, RAGW2, RAGW3 is connected to one base station BS1 to BS3 only.

The radio access gateway ARAGW, RAGW2, RAGW3 is responsible for the protocol conversion between a wireless network WNW and the IP-based network IPNW. Each radio access gateway ARAGW, RAGW2, RAGW3 is responsible for the data transmission between the IP network IPNW and one or more base stations BS1 to BS3 within its service area. The radio access gateway ARAGW, RAGW2, RAGW3 carries out the necessary changes in the voice data received from the base station BS1 to BS3 such that the data can be transmitted to an end point EP in the IP network IPNW. The EP can, for example, be another VoIP gateway or VoIP terminal. If the EP is another VoIP gateway, the IP network can only serve as a bearer network in a call between two GSM terminals, for example.

When a voice connection is established for the terminal MS, a logical connection is also negotiated between the radio access gateway ARAGW, RAGW2, RAGW3 and the end point EP either at the instigation of the end point or the radio access gateway. According, to stored settings associated with the logical connection, the EP transmits the data directed to the terminal MS to the radio access gateway. The EP does not actually know that the data is to be transmitted to the terminal MS, but it is capable of transmitting the data directed to the terminal MS to the radio access gateway on the basis of the settings of the negotiated logical connection. The radio access gateway detects that the data is supplied from the end point EP, in which case it, according to the settings of the wireless connection, transmits the data to the terminal MS (e.g. by placing the data in timeslots reserved for the MS). The settings typically utilize Transport Service Access Point TSAP addresses, on the basis of which the EP and the radio access gateway are able to transmit the data correctly. A TSAP address comprises an IP address and a port number.

The radio access gateway ARAGW, RAGW2, RAGW3 converts the frames of the voice information and other potential data received from the base station BS1 to BS3 into a form which accords with the VoIP protocol used to be transmitted to the IP network. The voice data received from the base station BS1 to BS3 may be compressed, in which case the radio access gateway may carry out decompression. When desired, the VoIP data may also be compressed into an 8 kbit/s form, for example. Similarly, the radio access gateway performs a protocol conversion on the data received from the IP network according to the wireless network WNW and transmits the data to the base station BS1 to BS3. The base station BS1 to BS3 transmits the data over the radio interface to the terminal MS. The connection between the radio access gateways ARAGW, RAGW2, RAGW3 is an IP-based connection and the radio access gateways are typically provided with fixed IP addresses.

Call control entities CC1, CC2, CC3 control the operation of the radio access gateways and are typically responsible for all signalling associated with the logical connections (shown in FIG. 1 by a dotted line). The call control entities CC1, CC2, CC3 play an important role particularly in connection establishment since they are responsible for transmitting connection setup requests to and from the radio access gateways. In addition to call establishment, the call control entities CC1, CC2, CC3 may be responsible for, for example, address translation, admission control and bandwidth management, maintaining terminal-specific information, such as location information, and billing for the same. Each radio access gateway ARAGW, RAGW2, RAGW3 is registered in a call control entity CC1, CC2, CC3 to enable the voice data associated with the terminals MS to be converted into VoIP in the radio access gateway, and vice versa. FIG. 1 also shows a call control entity CC4, which controls the end point EP and is responsible for the connection setup thereof.

FIG. 1 shows one call control entity CC1 to CC4 for each radio access gateway/end point; it is to be noted, however, that one call control entity may control a plurality of radio access gateways/end points. Neither are the call control entities CC1 to CC4 always necessary, i.e. the end points EP and the radio access gateways ARAGW, RAGW2, RAGW3 may themselves be responsible for the tasks of the call control entities. Depending on the network, the call control entities CC1 to CC3 may also communicate with a central element of the telecommunication system. This central element is, for example, a Mobile Switching Centre MSC in the GSM system or a Serving GPRS Support Node SGSN in a General Packet Radio System GPRS.

Figure 2:
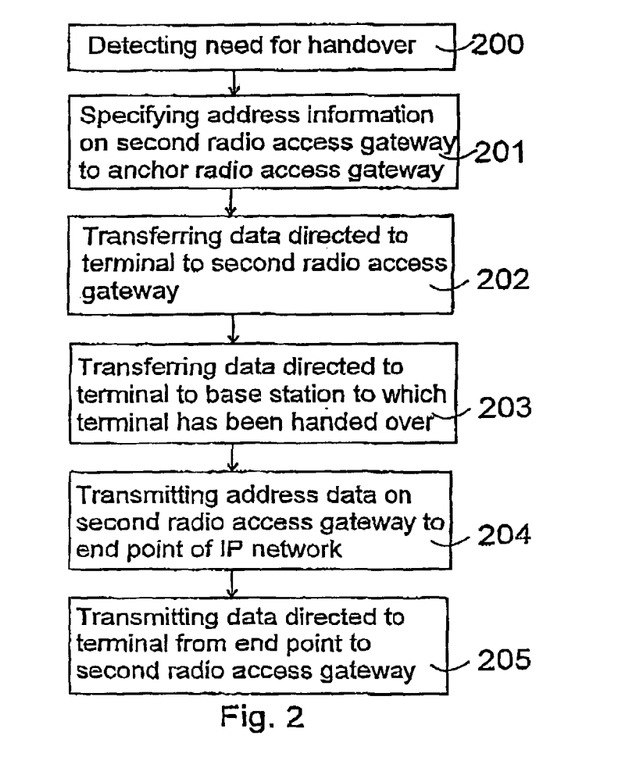
FIG. 2 is a flow diagram showing a radio access gateway being changed.

In the following, changing a radio access gateway according to a preferred embodiment of the invention will be described with reference to FIG. 2. A connection for transferring voice information is established between a first radio access gateway ARAGW and the terminal MS through the base station BS1 connected to the ARAGW. The first radio access gateway temporarily serves as an "Anchor RAGW" ARAGW for the terminal MS. This means that if necessary, the terminal MS may be handed over to a base station connected to a second radio access gateway and the anchor radio access gateway may be responsible for transferring the data directed to the terminal to the second radio access gateway immediately after the handover. The logical connection between the ARAGW and the end point EP in the IP network IPNW can be established according to the signalling arrangements of the VoIP standard used. The logical connection between the EP and the ARAGW provides the transfer of data flows having different directions.

When it is detected 200 that handover is needed to the base station BS2, which is connected to the second radio access gateway RAGW2, it is also necessary to change the responsibility for the wireless connection to the second radio access gateway RAGW2. Address information on the second radio access gateway RAGW2 is then specified 201 to the anchor radio access gateway ARAGW. A radio channel is allocated to the terminal MS from the base station BS2 connected to the second radio access gateway RAGW2.

When the terminal MS has been handed over to the base station BS2 connected to the second radio access gateway RAGW2, the data directed to the terminal MS is transferred 202 from the first radio access gateway (the anchor radio access gateway ARAGW) td the second radio access gateway RAGW2. The RAGW2 can then transmit 203 the data received from the ARAGW and associated with the voice connection of the terminal MS to the terminal MS through the new base station BS2. The RAGW2 can direct the data transmitted from the terminal MS directly to the end point EP or the anchor radio access gateway ARAGW.

When the data associated with the terminal MS can be transmitted through the new radio access gateway RAGW2, i.e. when the situation has become stable, the address information on the second radio access gateway RAGW2 is transmitted 204 to the end point EP in the IP network. The end point EP is arranged to transmit 205 the data directed to the terminal MS to the second radio access gateway RAGW2 according to the address information.

When the VoIP data is first transmitted through the anchor radio access gateway ARAGW, it is possible to quickly connect media streams to the new radio access gateway. Consequently, problems caused particularly by differences between the timing of the media streams and the timing of signalling typically carried out through a call control entity can be avoided. The differences may cause the quality of the time-critical media streams, such as voice and video, to degrade quite dramatically. When the signalling for directing the media streams from the end point to the second radio access gateway is carried out only after the handover, the duration of the signalling does not affect the media streams. When the anchor radio access gateway ARAGW is released, the need for frequency band decreases and the quality of the media streams improves.

The actual signalling associated with changing the radio access gateway is carried out through the call control entities CC1 to CC4. The call control entities CC1 to CC3 preferably comprise configuration information on the radio access gateways, base stations connected to the radio access gateways and call control entities controlling the radio access gateways. According to a preferred embodiment, the call control entity CC1 of the anchor radio access gateway ARAGW decides whether or not the radio access gateway needs to be changed on the basis of configuration information and other information obtained from the ARAGW.

A call control entity CC1 to CC3 according to a preferred embodiment comprises means for negotiating a logical connection between the radio access gateway it controls and the second radio access gateway if the CC1 to CC3 detects that handover is needed for a terminal in its service area to a base station connected to the second radio access gateway. The call control entity CC1 to CC3 typically comprises at least means for transmitting the address information on the second radio access gateway to the first radio access gateway (anchor radio access gateway ARAGW). Furthermore, the call control entity comprises means for transmitting the address information on the second radio access gateway RAGW2 to the end point EP in the IP network or the call control entity CC4 controlling the same.

The anchor radio access gateway ARAGW comprises means for routing, e.g. by encapsulation, received packets directed to the terminal to the second radio access gateway being responsible for the protocol conversion. The data transfer between the ARAGW and the RAGW2 may be carried out by using any transfer mechanism used in the IP network, typically by utilizing a Real-time Transport Protocol RTP. The radio access gateways ARAGW, RAGW2, RAGW3 and the call control entities CC1 to CC4 comprise processors and memory controlling their operation. The functionality illustrated in connection with FIG. 2 can preferably be implemented by software in the processors; if necessary, it is also possible to use integrated circuits.

Figure 3:
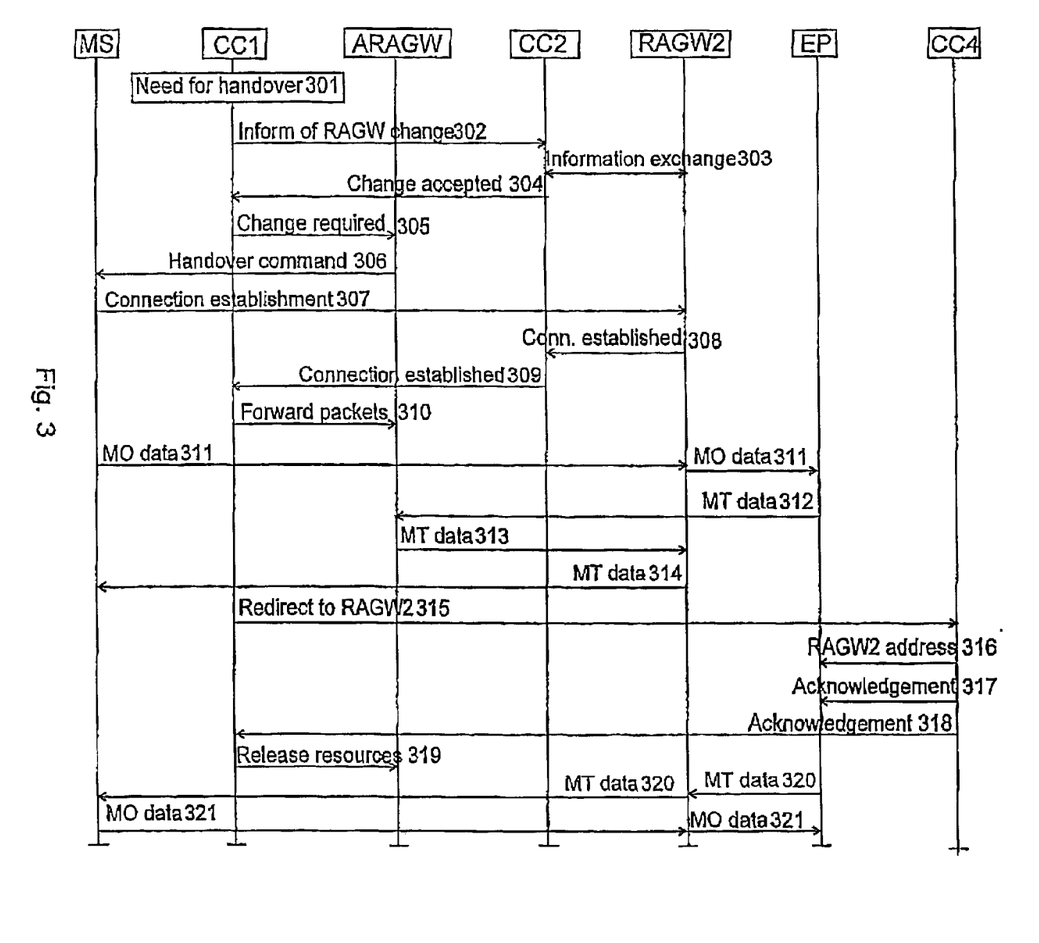
FIG. 3 is a signalling diagram illustrating in closer detail the radio access gateway being changed.

In accordance with a preferred embodiment of the invention, FIG. 3 shows in closer detail how the MS is changed from the anchor radio access gateway ARAGW to the second radio access gateway RAGW2 during an ongoing voice connection, the ARAGW and the RAGW2 having separate call control entities CC1 and CC2. On the basis of information received from the ARAGW, the call control entity CC1 of the anchor radio access gateway ARAGW monitors whether it is necessary to assign some other radio access gateway to be responsible for the protocol conversion of the terminal MS. When it has been detected at the ARAGW that handover to a new base station BS2 is necessary, the call control entity CC1 is informed of this. Preferably on the basis of the configuration information and handover information received from the ARAGW, the CC1 detects that handover to the base station BS2 connected to the second radio access gateway RAGW2 is necessary 301 (Need for handover). The CC1 finds out the second call control entity CC2 controlling the second radio access gateway RAGW2 and informs 302 the CC2 of the necessary change of the radio access gateway (Inform of RAGW change). According to a preferred embodiment of the invention, the CC1 transmits address information on the end point EP to the CC2 in a message 302. The CC2 forwards 303 (Information exchange) the address information on the EP and the information indicating that handover is necessary to the radio access gateway RAGW2, whereby the address information on the end point EP can be specified to the second radio access gateway RAGW2.

In step 303, it is also preferably checked whether a wireless connection can be established for the terminal MS to the base station BS2 connected to the RAGW2 and whether the RAGW2 could become responsible for the protocol conversion associated with the voice connection of the MS. If the terminal MS can be served, the RAGW2 can already reserve the necessary resources for the new connection. If the terminal MS can be served within the area of the RAGW2, the CC2 informs 304 (Change accepted) the call control entity CC1 of this. In this message, the CC2 preferably also transmits the handover information received (303) from the second radio access gateway RAGW2 intended for the terminal MS for establishing the connection to the base station BS2 and further to the radio access gateway RAGW2.

The CC1 informs 305 (Change required) the anchor radio access gateway ARAGW that the radio access gateway has to be changed to RAGW2, whereby the address information on the second radio access gateway RAGW2 can be transmitted to the ARAGW. The address information on the radio access gateway ARAGW, RAGW2, RAGW3 and the end point EP typically comprises TSAP addresses. It is also feasible that the address information on the RAGW2 is not transmitted until in connection with a command 310.

According to the information 305 from the CC1, the anchor radio access gateway ARAGW transmits 306 (Handover command) a command to the terminal MS to carry out handover to the base station (BS2) connected to the second radio access gateway RAGW2. This message comprises the necessary handover information to enable the MS to request for handover to the base station BS2. A connection is established 307 (Connection establishment) between the terminal MS, the base station BS2 and further the second radio access gateway RAGW2 on the basis of the information received from the ARAGW.

When the connection between the terminal MS and the second radio access gateway RAGW2 has been established, the RAGW2 informs 308 (Conn. established) the call control entity CC2 of the connection setup. The CC2 further informs 309 (Connection established) the call control entity CC1 of the connection setup. The CC1 transmits 310 (Forward packets) to the anchor radio access gateway ARAGW a command to disconnect the connection provided for the terminal MS through the base station BS1 and to start transmitting the data associated with the terminal MS to the RAGW2. On the basis of the command 310 received from the CC1, the settings of the ARAGW are modified and the ARAGW is arranged to transmit data 312 (MT data) supplied from the TSAP address of the EP to the RAGW instead of the base station BS1.

Next, the ARAGW starts transmitting 313 (MT data) the data directed to the terminal MS to the second radio access gateway RAGW2. The RAGW2 performs the protocol conversion between the protocol of the IP-based network IPNW received from the ARAGW and the protocol of the wireless network WNW on the data (e.g. places the data comprising voice information from the H.323 packets into the speech frames of the GSM system) and transmits 314 the data to the terminal MS. It is also feasible that the ARAGW already performs part of the protocol conversion but it is unable to complete it (since the network between the radio access gateways is an IP-based network). The RAGW2 converts the data 311 (MO data) associated with the voice connection and received from the terminal MS to data that accords with the IP protocol used and transmits 311 the converted data to the end point EP. This requires that the EP should be able to accept data also from the new address.

The first part of the process for changing a radio access gateway is now completed. The system proceeds to the second part wherein preferably the CC1 transmits 315 (Redirect to RAGW2) a data redirection request to the call control entity CC4 of the end point EP in the IP network IPNW. The request 315 comprises the address information on the second radio access gateway RAGW2. A timer is preferably used for transmitting the request, i.e. the address information is transmitted to the end point EP when a predetermined period of time has elapsed since the handover. The CC1 may transmit the request after a predetermined period of time has elapsed since the message 309 comprising the connection setup information was received, for example. On the basis of the message 315 and the previous settings associated with the logical connection, the CC4 detects that the request concerns redirecting the data directed to the terminal MS to the RAGW2. The CC4 transmits 316 (RAGW2 address) a command to the end point EP to direct data comprising the media streams directed to the end point, i.e. data directed to the TSAP address of the ARAGW, to the address of the second radio access gateway RAGW2. The EP replies 317 (Acknowledgement) to the command 316, on the basis of which the CC4 can transmit 318 (Acknowledgement) a reply to the call control entity CC1.

If it is possible to redirect the data to the RAGW2, the CC1 transmits 319 (Release resources) a command to the ARAGW to release the resources associated with the data transfer of the terminal MS. The ARAGW can then remove the setting for transferring data to the second radio access gateway RAGW2. As distinct from FIG. 3, no acknowledgement message 318 is necessarily required but the CC1 may transmit the command 319 after a predetermined period of time has elapsed since the resources were released. Preferably immediately after receiving the address information on the RAGW2, the EP starts transmitting 320 (MT data) packets comprising the data directed to the terminal MS to the second radio access gateway RAGW2. In practice, this can be carried out such that instead of the TSAP address of the ARAGW, the EP now transmits the data received from an application or another network element to the TSAP address of the RAGW2, according to the command 316 received from the CC4. The RAGW2 detects that the packets are supplied from the EP and directed to the terminal MS, and forwards them to the MS through the base station BS2. The RAGW2 acts as before, i.e. transmits 321 (MO data) the data received from the terminal MS to the end point EP.

In the example described above, the end point EP and the radio access gateways ARAGW, RAGW2 are provided with separate call control entities CC1, CC2 and CC4, but they can also be controlled by the same call control entity. As distinct from FIG. 3, it is feasible that the CC2 controlling the second radio access gateway RAGW2 is arranged to start the second part, i.e. to transmit the address information on the RAGW2 to the CC4 (315). Since the CC1 has already negotiated the connection with the EP, it is recommended that it should communicate with the CC4.

It is also feasible that when the anchor radio access gateway ARAGW is used, the RAGW2 transmits the data directed to the end point EP (MO data 311) to the ARAGW. The ARAGW, in turn, transmits the data to the end point EP. In this case, the address information on the anchor radio access gateway ARAGW is transmitted (302, 303) to the second radio access gateway RAGW2. The RAGW2 can start transmitting the data received from the terminal MS to the anchor radio access gateway ARAGW, which is then responsible for forwarding the data to the end point EP. During the execution of the second part, i.e. when the ARAGW is released, the address information on the end point EP may also be transmitted to the RAGW2. The RAGW2 can next start transmitting 321 the data received from the terminal MS to the end point EP.

If it is detected that a further handover is needed for the terminal MS to a base station BS3 connected to a third radio access gateway RAGW3, the radio access gateway can also be changed from the RAGW2 to the RAGW3. If the anchor radio access gateway ARAGW has already been released and the EP transmits the data directed to the terminal MS to the RAGW2, the steps described in connection with FIG. 3 can be executed. The RAGW2 then first operates as the anchor radio access gateway, and the EP is arranged to transmit the data directed to the MS to the RAGW3.

If the anchor radio access gateway ARAGW is still in use, the ARAGW can be arranged to transmit the data directed to the MS to the third radio access gateway RAGW3. When the handover has been completed, preferably the CC1 transmits the address information on the RAGW3 to the CC4, and the EP can be arranged to transmit the data directed to the MS to the RAGW3. It is to be noted, however, that it is most unlikely that the MS would need handover to a base station connected to a new radio access gateway before the anchor radio access gateway ARAGW is released.

Firewalls may be used whose settings, according to a preferred embodiment of the invention, can be changed at the same time as the settings of the logical connection of the end point EP are changed.

According to a preferred embodiment of the invention, data is transferred in the IP network IPNW according to the H.323 standard. The protocol conversion carried out by the radio access gateway ARAGW, RAGW2, RAGW3 preferably takes place such that the data which accords with the wireless network at issue and which is transferred from the terminal MS at least through the base station BS1 to BS3 is converted to packets according to the H.323 protocol, and vice versa.

The inventive functionality of the radio access gateways ARAGW, RAGW2, RAGW3 can be implemented in a gateway described in the H.323 standard. The functionality of the call control entity CC1 to CC4 can be implemented in a gatekeeper described in the H.323 standard. The gatekeepers are provided with a certain zone, and the gatekeeper controls the H.323 gateways, H.323 terminals, multipont control units MCU within the zone and the connection management thereof.

Figure 4:
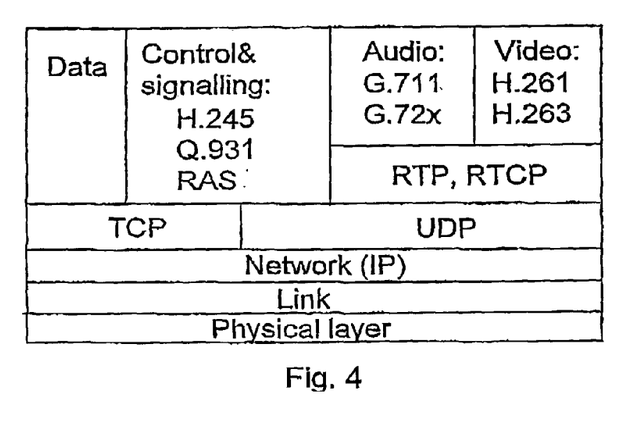
FIG. 4 illustrates a protocol stack according to the H.323 standard.

Referring to FIG. 4, the H.323 standard comprises several protocols. Depending on the application, a reliable transmission control protocol TCP or a non-reliable user datagram protocol UDP is used above the IP network protocol. The RTP and a real-time transport control protocol RTCP are responsible for packaging and synchronizing the audio/media streams over a packet-switched network. For example an ITU G.711 codec and different ITU G.72x codecs (e.g. G.723) can be used as an audio codec. At least codecs according to the H.261 and H.263 standards can be used as a video codec. The H.323 standard also supports transferring other data according to the T.120 standard.

Being based on Q.931 signalling, an H.225 protocol is responsible particularly for signallings associated with connection setup and. An H.245 protocol specifies conference control and capability exchange messages. The H.225 protocol specifies registration, admissions and status RAS messages used e.g. for finding and registering the gatekeepers and Q.931 messages used mainly in connection setup between the end points. These messages can be utilized when information associated with changing the radio access gateway illustrated in FIG. 3 is signalled. A "Facility" message, for example, is well suited to this purpose. It is also feasible to utilize the H.245 protocol or an entirely new protocol in signalling the change of a radio access gateway. The data directed to the terminal MS can preferably be transferred between the radio access gateways ARAGW, RAGW2, RAGW3 by establishing an H.323 call therebetween.

According to a preferred embodiment, the message 315 is an [Open Logical Channel] message according to the H.245 protocol. This message may refer to the logical connection established earlier between the ARAGW and the EP (on the basis of the identifier of the logical connection) and specify it to be replaced in the replacement field (Replacement for) by the logical connection to the second radio access gateway RAGW2 according to the address of the RAGW2. The CC4 transmits the message to the end point EP, which replaces the logical connection to the ARAGW by the logical connection to the RAGW2.

According to an embodiment of the invention, data transfer in the IP network IPNW utilizes an SIP protocol. The SIP protocol is responsible for specification of terminals and the characteristics thereof, connection setup negotiation, data transfer and connection release. The parties are identified on the basis of SIP addresses, which are in a uniform resource locator URL form. Many SIP protocol messages are text-based and based on a hyper text transfer protocol HTTP. The inventive functionality of the radio access gateways ARAGW, RAGW2 and RAGW3 and the end point EP described above can be implemented in SIP user agents. The inventive functionality of the call control entities CC1 to CC4 described above can be implemented in SIP servers or SIP proxy servers described in the SIP standard, and information associated with changing the SIP agents can be transmitted by utilizing the SIP messages.

The invention can also be applied to the H.248 standard, in which case the functionality of the radio access gateways ARAGW, RAGW2 and RAGW3 can be implemented as part of an H.248 media gateway. The functionality of the call control entities CC1 to CC4, in turn, can be implemented as part of an H.248 media gateway controller.

Figure 5:
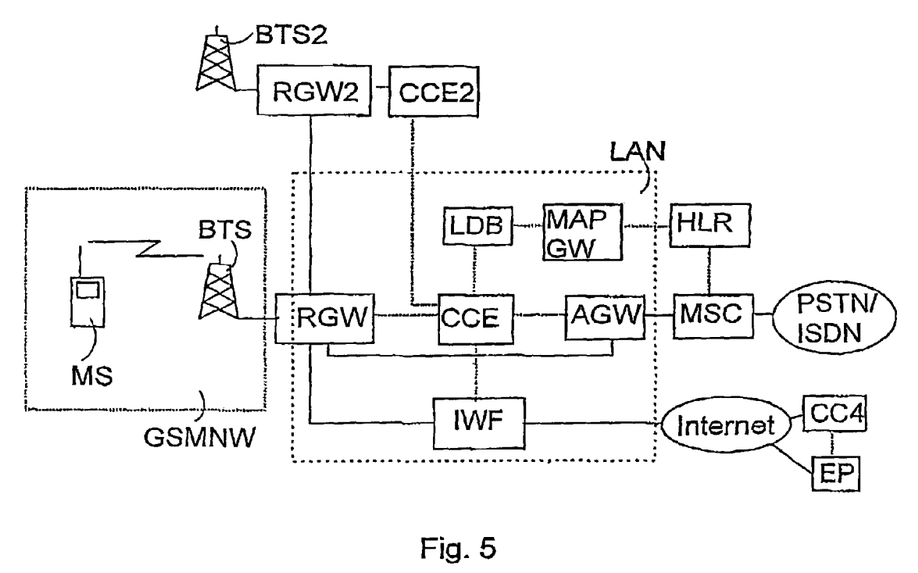
FIG. 5 shows in closer detail a wireless telecommunication system based on the GSM system.

FIG. 5 shows in closer detail a wireless telecommunication system which is particularly well suited to the purpose of providing wireless data connections in an office environment. The system shown in FIG. 5 is based on the GSM system with an IP-based local area network LAN for, for example, an internal office use added thereto. The terminal MS can be a terminal entirely according to the GSM standard comprising a subscriber identity module SIM and communicating with a base transceiver station BTS of a GSM network GSMNW.

The BTS is connected to a radio access gateway RGW implementing, for example, the functions of an H.323 gateway. The RGW carries out the necessary conversions on the data (including the signalling data) between the base transceiver station BTS (Abis interface) and the LAN network LAN used. The RGW controls one or more base transceiver stations BTS and thus also the radio network and radio resources. When a voice connection has been established for the terminal MS, the RGW places the voice information in the packets received from the IP based network LAN into the time slots reserved for the MS, and vice versa. The RGW also decides over handovers (handover management) between the base transceiver stations BTS. For the base transceiver station BTS, the RGW is thus a base station controller BSC of the GSM system.

A call control entity CCE is responsible for call control and mobility management for the terminals MS visiting the area of the radio access gateways RGW within its area. The CCE is responsible for address modification functions and collecting call data records. The CCE also serves as an interface for operation and maintenance O&M of the network run by an O&M server (not shown in FIG. 5). The CCE may allow the reservation of data transfer resources for the terminal MS by utilizing a location database LDB. The LDB is responsible for various directory services, such as maintenance of terminal- and subscriber-specific information and data transmission to the CCE when necessary. The LDB also maintains location information on the terminals MS obtained from location updates and collects billing information from the CCE. The LDB is typically also connected to a home location register HLR of the GSM network through a mobile application part gateway MAPGW.

The call control entity CCE is connected to an A-interface gateway AGW, which relays data between the LAN network and a mobile switching centre MSC of the GSM network. A data transmission connection can thus be established between the AGW and the GSM network, a further connection to PSTN/ISDN networks and terminals connected thereto thus being also possible. The IP-based data transfer and reception can also be carried out from the RGW through an interworking function IWF to external IP-based networks, such as the Internet. The IWF is responsible for protocol conversions on the lower layers in the data transfer between the LAN network LAN and the external networks.

When radio access gateways ARAGW, RAGW2 and RAGW3 according to the above description are linked to the system of FIG. 5, their inventive functionality can be implemented as a part of the RGW. The RGW is then responsible for the protocol conversion between the GSM network GSMNW and the IP-based network LAN. In voice transmission, the voice information is then modified from the GSM frames to e.g. packets of the VoIP according to the H.323 protocol, and vice versa. The above-described inventive functionality of the call control entities CC1 to CC3 responsible for controlling the radio access gateways and VoIP connections is preferably a part of the call control entity CCE. In order to enable the mobility of the terminals MS between the radio access gateways RAGW, RAGW2 belonging to different call control entities to be supported, a signalling connection can be established between the call control entities CCE and CCE2.

In the system of FIG. 5, it may become necessary to change the radio access gateway used when the MS is handed over to the BTS2 connected to a different radio access gateway (RGW2). The RGW decides on handover to the new base station and preferably the call control entity CCE detects that the radio access gateway also needs to be changed. The CCE and the CCE2 then negotiate over changing the radio access gateway and transmit the necessary information to the radio access gateways RGW and RGW2. Since the RGW(2) emulates the base station controller BSC of the GSM system and the GSM handover process is well known from *The GSM System for Mobile Communications* by M. Mouly and M. Pautet, Palaiseau, France, 1992, ISBN; 2-9507190-0-7, for example, it is unnecessary to describe the actual handover process in closer detail in connection with the present application. When the connection has been established to the new base transceiver station BTS2, data transfer can be arranged between the radio access gateways RGW and RGW2.

Figure 6:
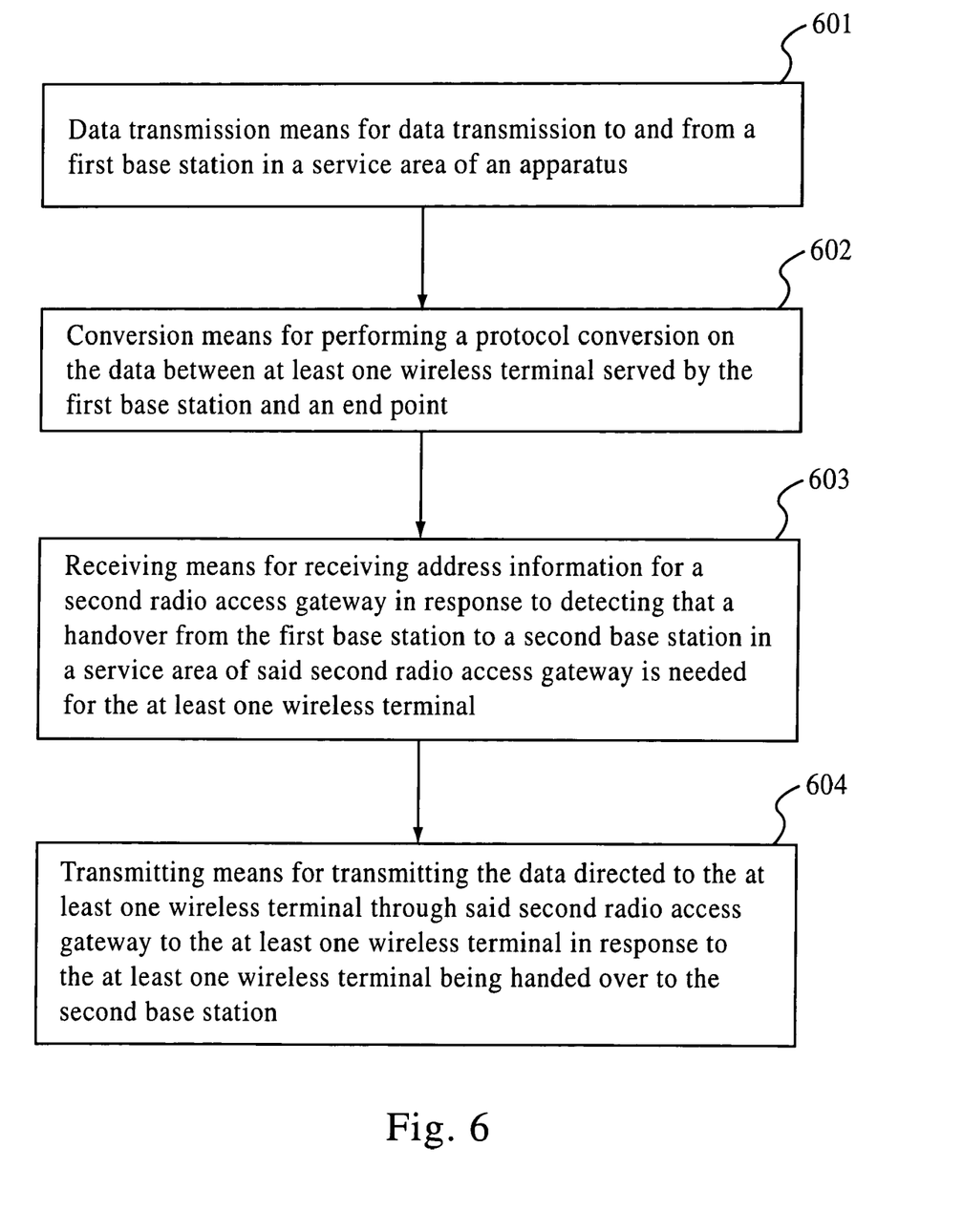
FIG. 6 shows a flow chart according to an example embodiment of the present general inventive concept.

The end point EP can transmit data to the terminal MS through the Internet, IWF and radio access gateway RGW. After handover to the RGW2, the CCE can transmit the address information on the RGW2 through the IWF to the end point EP or the call control entity CC4 controlling the same, Next, the EP can be arranged to transmit the data directed to the MS to the radio access gateway RGW2 (not shown in FIG. 5). The end point EP may also be, for example, an A-interface gateway AGW, whereby the VoIP data can be converted to a voice stream according to the A-interface and further transmitted to another GSM network, ISDN network or PSTN network. FIG. 6 illustrates an example flow chart of an apparatus according to the general inventive concept of the present invention. 601 illustrates data transmission means for data transmission to and from a first base station in a service area of the apparatus. 602 illustrates conversion means for performing a protocol conversion on the data between at least one wireless terminal served by the first base station and an end point. 603 illustrates receiving means for receiving address information for a second radio access gateway in response to detecting that a handover from the first base station to a second base station in a service area of said second radio access gateway is needed for the at least one wireless terminal. 604 illustrates transmitting means for transmitting the data directed to the at least one wireless terminal through said second radio access gateway to the at least one wireless terminal in response to the at least one wireless terminal being handed over to the second base station.

It is to be noted that the area of application of the invention is by no means restricted to the system shown in FIG. 5 but the invention can also be utilized in systems comprising radio access gateways based on universal mobile telecommunications system UMTS or different wireless LAN WLAN standards, for example. It is obvious to one skilled in the art that as technology advances, the idea underlying the invention can be implemented in many different ways. The invention and the embodiments thereof are thus not restricted to the examples described above but can vary within the scope of the claims.

The invention claimed is:

1. A method, comprising:
specifying, to a first radio access gateway, which is configured to perform a protocol conversion on data between a wireless terminal and an end point, address information for a second radio access gateway in response to detecting that a handover from a first base station in a service area of the first radio access gateway to a second base station in a service area of the second radio access gateway is needed for the wireless terminal;
transmitting a data directed to the at least one wireless terminal through said first radio access gateway and said second radio access gateway to the at least one wireless terminal in response to the at least one wireless terminal being handed over to the second base station; and
transmitting address information for said second radio access gateway to the end point, so that the end point may transmit information associated with the address information of the second radio access gateway.

2. A method as claimed in claim 1, further comprising:
transmitting address information on the end point to said second radio access gateway; and
transmitting the data received from the at least one wireless terminal on said second radio access gateway to the end point based on the address information on the end point.

3. A method as claimed in claim 1, wherein said first radio access gateway, said second radio access gateway and the end point are controlled by one or more call control entities.

4. A method as claimed in claim 1, wherein
the data transmitted between the terminal and the end point comprises voice information.

5. A method as claimed in claim 1, wherein
the address information on said second radio access gateway is transmitted to the end point when a predetermined period of time has elapsed since the handover.

6. A method as claimed in claim 1, wherein
the data transfer is configured by one of the following protocols H.323, session initiation protocol or H.248.

7. A method as claimed in claim 1, wherein said terminal, said first and said second base stations support global system for mobile communication standard, and
said radio access gateways comprise means for carrying out the protocol conversion between the wireless network according to a global system for mobile communication system and an IP-based network.

8. A method, comprising:
specifying, to a first radio access gateway address information for a second radio access gateway in response to detecting that a handover from a first base station to a second base station is needed for the wireless terminal;
transmitting a data directed to the at least one wireless terminal through said first radio access gateway and said second radio access gateway to the at least one wireless terminal in response to the at least one wireless terminal being handed over to the second base station;
transmitting address information for said second radio access gateway to the end point; and
transmitting the data directed to the at least one wireless terminal from the end point to said second radio access gateway based on the address information,
wherein said first radio access gateway, said second radio access gateway and the end point are controlled by one or more call control entities
said first radio access gateway is controlled by a first call control entity, said second radio access gateway is controlled by a second call control entity and the end point is controlled by a third call control entity,
the first and the second call control entities comprise configuration information on the radio access gateways, the base stations connected to the radio access gateways and the call control entities controlling the radio access gateways,
information about a need to change the radio access gateway is transmitted from the first call control entity to the second call control entity in response to detecting, based on the information received from the first radio access gateway, that handover to the second base station is necessary,
the address information on the second radio access gateway is transmitted to said first radio access gateway from the first call control entity,
a handover command to establish a connection to the second base station is transmitted from said first radio access gateway to the at least one wireless terminal,
a connection between the terminal and said second radio access gateway is established,
the settings of said first radio access gateway are changed based on the address information on the second radio access gateway,
the data directed to the terminal is transmitted from said first radio access gateway to said second radio access gateway,
a data redirection request comprising the address information on the second radio access gateway is transmitted from the first call control entity to the third call control entity, and
a command to transmit the data to said second radio access gateway instead of the first radio access gateway is transmitted from the third call control entity to the end point.

9. A memory configured to store software when executed controls a processor to perform:
specifying, to a first radio access gateway, which is configured to perform a protocol conversion on data between a wireless terminal and an end point, address information for a second radio access gateway in response to detecting that a handover from a first base station in a service area of the first radio access gateway to a second base station in a service area of the second radio access gateway is needed for the wireless terminal;
transmitting a data directed to the at least one wireless terminal through said first radio access gateway and said second radio access gateway to the at least one wireless terminal in response to the at least one wireless terminal being handed over to the second base station; and
transmitting address information for said second radio access gateway to the end point, so that the end point may transmit information associated with the address information of the second radio access gateway.

10. A memory as claimed in claim 9, wherein said first radio access gateway, said second radio access gateway and the end point are controlled by one or more call control entities.

11. A memory as claimed in claim 9, wherein
the data transmitted between the terminal and the end point comprises voice information.

12. A memory as claimed in claim 9, wherein
the address information on said second radio access gateway is transmitted to the end point when a predetermined period of time has elapsed since the handover.

13. A memory as claimed in claim 9, wherein
the data transfer is configured by one of the following protocols H.323, session initiation protocol or H.248.

14. A memory as claimed in claim 9, wherein said terminal, said first and said second base stations support global system for mobile communication standard, and
said radio access gateways comprise means for carrying out the protocol conversion between the wireless network according to a global system for mobile communication system and an IP-based network.

15. A memory configured to store software when executed controls a processor to perform:
specifying, to a first radio access gateway address information for a second radio access gateway in response to detecting that a handover from a first base station to a second base station is needed for the wireless terminal;
transmitting a data directed to the at least one wireless terminal through said first radio access gateway and said second radio access gateway to the at least one wireless terminal in response to the at least one wireless terminal being handed over to the second base station;
transmitting address information for said second radio access gateway to the end point; and
transmitting the data directed to the at least one wireless terminal from the end point to said second radio access gateway based on the address information,
wherein said first radio access gateway, said second radio access gateway and the end point are controlled by one or more call control entities
said first radio access gateway is controlled by a first call control entity, said second radio access gateway is controlled by a second call control entity and the end point is controlled by a third call control entity,
the first and the second call control entities comprise configuration information on the radio access gateways, the base stations connected to the radio access gateways and the call control entities controlling the radio access gateways,
information about a need to change the radio access gateway is transmitted from the first call control entity to the second call control entity in response to detecting, based on the information received from the first radio access gateway, that handover to the second base station is necessary,
the address information on the second radio access gateway is transmitted to said first radio access gateway from the first call control entity,
a handover command to establish a connection to the second base station is transmitted from said first radio access gateway to the at least one wireless terminal, a connection between the terminal and said second radio access gateway is established, the settings of said first radio access gateway are changed based on the address information on the second radio access gateway, the data directed to the terminal is transmitted from said first radio access gateway to said second radio access gateway, a data redirection request comprising the address information on the second radio access gateway is transmitted from the first call control entity to the third call control entity, and a command to transmit the data to said second radio access gateway instead of the first radio access gateway is transmitted from the third call control entity to the end point.

* * * * *